(12) United States Patent
Carrara et al.

(10) Patent No.: US 12,209,625 B2
(45) Date of Patent: Jan. 28, 2025

(54) BRAKE CALIPER OF DISC BRAKE, DISC BRAKE SYSTEM AND DETECTING DEVICE

(71) Applicant: BREMBO S.p.A., Curno (IT)

(72) Inventors: Marco Carrara, Curno (IT); Luca D'Urso, Curno (IT); Mauro Reolon, Curno (IT); Paolo Sala, Curno (IT); Beniamin Szewczyk, Curno (IT)

(73) Assignee: Brembo S.p.A., Bergamo (IT)

( * ) Notice: Subject to any disclaimer, the term of this patent is extended or adjusted under 35 U.S.C. 154(b) by 402 days.

(21) Appl. No.: 17/610,723

(22) PCT Filed: May 12, 2020

(86) PCT No.: PCT/IB2020/054468
§ 371 (c)(1),
(2) Date: Nov. 12, 2021

(87) PCT Pub. No.: WO2020/230015
PCT Pub. Date: Nov. 19, 2020

(65) Prior Publication Data
US 2022/0221014 A1    Jul. 14, 2022

(30) Foreign Application Priority Data
May 13, 2019   (IT) .................. 102019000006765

(51) Int. Cl.
*F16D 65/00*   (2006.01)
*F16D 55/00*   (2006.01)
(Continued)

(52) U.S. Cl.
CPC ....... *F16D 65/0068* (2013.01); *F16D 55/226* (2013.01); *F16D 2055/0008* (2013.01);
(Continued)

(58) Field of Classification Search
CPC .... B60T 17/22; F16D 55/226; F16D 65/0068; F16D 65/18; F16D 65/183;
(Continued)

(56) References Cited

U.S. PATENT DOCUMENTS

| | | | |
|---|---|---|---|
| 7,117,748 B2 | 10/2006 | Baumann et al. | |
| 9,157,820 B2 | 10/2015 | Heise et al. | |

(Continued)

FOREIGN PATENT DOCUMENTS

JP    2018025402 A    2/2018

OTHER PUBLICATIONS

European Patent Office, International Search Report with Written Opinion, issued in PCT/IB2020/054468, Aug. 26, 2020, 11 pages, European Patent Office, Rijswijk, Netherlands.

*Primary Examiner* — Robert A. Siconolfi
*Assistant Examiner* — San M Aung
(74) *Attorney, Agent, or Firm* — Marshall & Melhorn, LLC

(57) ABSTRACT

A brake caliper for a disc brake system has a caliper body straddling the disc and having a first elongated portion facing a first braking surface of the brake disc, and a second elongated portion, opposite to the first elongated portion and facing a second braking surface of the brake disc opposite to the first braking surface. A bridge connects the first elongated portion and the second elongated portion to each other. The brake caliper has at least one pair of opposite brake pads, each brake pad having friction material and a support plate supporting the friction material, the support plate having a plate back facing a respective elongated portion of the first and second elongated portions. A detecting device for detecting a biasing force directed in axial direction is interposed between the plate back of the second brake pad and the second elongated portion of the caliper body.

17 Claims, 6 Drawing Sheets

(51) Int. Cl.
*F16D 55/226* (2006.01)
*F16D 65/18* (2006.01)
*F16D 66/00* (2006.01)
*F16D 121/24* (2012.01)

(52) U.S. Cl.
CPC .... *F16D 2055/0016* (2013.01); *F16D 65/183* (2013.01); *F16D 2066/005* (2013.01); *F16D 2121/24* (2013.01)

(58) Field of Classification Search
CPC ..... F16D 2055/0008; F16D 2055/0016; F16D 2066/005; F16D 2121/24
USPC ....................................................... 188/72.1
See application file for complete search history.

(56) References Cited

U.S. PATENT DOCUMENTS

| | | | |
|---|---|---|---|
| 9,415,757 B2 * | 8/2016 | Martinotto | F16D 65/092 |
| 10,138,964 B2 | 11/2018 | Lee et al. | |
| 2004/0187591 A1 * | 9/2004 | Baumann | F16D 65/18 |
| | | | 73/779 |
| 2013/0192933 A1 * | 8/2013 | King | F16D 66/027 |
| | | | 188/1.11 L |
| 2013/0233065 A1 | 9/2013 | Heise et al. | |
| 2014/0311833 A1 * | 10/2014 | Martinotto | F16D 65/092 |
| | | | 29/25.35 |
| 2017/0082163 A1 * | 3/2017 | Serra | B60T 17/22 |
| 2017/0321773 A1 | 11/2017 | Lee et al. | |
| 2019/0056002 A1 * | 2/2019 | Neumann | F16D 55/225 |

* cited by examiner

BRAKE CALIPER OF DISC BRAKE, DISC BRAKE SYSTEM AND DETECTING DEVICE

CROSS-REFERENCE TO RELATED APPLICATIONS

This application is a National Phase Application of PCT International Application No. PCT/IB2020/054468, having an International Filing Date of May 12, 2020, which claims priority to Italian Application No. 102019000006765 filed May 13, 2019, each of which is hereby incorporated by reference in its entirety.

FIELD OF THE INVENTION

The present invention relates to a brake caliper for a disc brake.

In particular, the present invention relates to a brake caliper comprising a detecting device.

The present invention further relates to a disc brake system and a vehicle comprising said disc brake system.

Furthermore, the present invention relates to a detecting device of a brake caliper.

PRIOR ART

In a disc brake, the brake caliper is generally arranged straddling the outer peripheral margin of a brake disc, adapted to rotate about a rotation axis defining an axial direction (X-X). In a disc brake, a radial direction (R-R), which is substantially orthogonal to said axial direction (X-X), and a tangential (T-T) or circumferential direction (T-T), orthogonal to both said axial direction (X-X) and said radial direction (R-R), is further defined.

Brake calipers are constrained to a support structure which remains stationary with respect to the vehicle wheel, such as, for example, a stub axle of a vehicle suspension, or a vehicle wheel hub, or a fork or swingarm of a motorcycle. A brake caliper usually comprises a caliper body having two opposite elongated portions arranged to face opposite braking surfaces of a brake disc respectively, and at least one caliper bridge, which connects said two elongated portions which protrude straddling the disc.

In a typical arrangement of a disc brake on a motorcycle, a braking surface of the brake disc faces towards the wheel of the motorcycle defining the axial side facing the motorcycle side or to the wheel, of the disc brake, while the other opposite braking surface of the brake disc faces towards the axially opposite direction, defining the side opposite to the motorcycle, or opposite wheel side, of the disc brake.

The part of the caliper facing the side of the disc opposite to the motorcycle typically has fixing means to the fork. Furthermore, the elongated portion of the caliper body facing the side of the disc opposite to the motorcycle has an important extension in an axial direction forming an overhanging portion which projects axially away from both the motorcycle wheel and the fork.

Clutch pads are provided arranged between each elongated portion of the caliper body and the facing braking surfaces of the brake disc.

In the floating caliper bodies associated with fixed discs, a floating or axially sliding portion of the caliper body has thrust means, e.g. a hydraulically actuated piston-cylinder assembly or an electrically actuated ball screw assembly on only one of its opposing elongated portions. Such thrust means apply a thrust action on the back of the facing brake pad to certify the friction material of the brake pad against a braking surface of the brake disc.

When the brake pad was abutted against such braking surface of the brake disc by the action of said thrust means, the floating or axially sliding body of the brake caliper undergoes an axial reaction force aimed at taking the opposite elongated portion of the brake caliper which mounts a brake pad against the opposite braking surface of the brake disc, thereby generating the braking action on both sides of the braking band of the brake disc. Axial guides are typically provided, e.g. in the form of pins, to guide the relative sliding of the floating portion of the brake caliper on the bracket, which is connected to a support structure integral with the motorcycle, in turn.

Typically, the elongated portion of the caliper body which mounts the thrust means and the attachment portion of the caliper body which is intended to form a firm connection to a support structure, which remains stationary with respect to the motorcycle, are provided on the side of the caliper which is facing towards the outside of the motorcycle. In this manner, the caliper body protrudes axially in relation to the dimension of the wheel of the motorcycle.

It is also generally known to mount floating brake calipers associated with fixed discs on a vehicle. In this case, the elongated portion which comprises the thrust means is typically arranged on the caliper side facing the vehicle as well as the vehicle connecting elements, while the side opposite to the vehicle, which is typically facing the vehicle wheel, is free from thrust means, and, therefore, has a smaller overhanging axial extension.

Therefore, the need is felt to reduce the axial dimensions of the elongated portion of the caliper body on the side of the disc opposite to the vehicle.

On the contrary, in the fixed caliper bodies associated with fixed discs, thrust means, e.g. cylinder-piston assemblies, are present in both the opposite elongated portions of the caliper body capable of applying a thrust action on the friction pad facing it, by making it abut against the braking surface of the disc, without needing to move the caliper body axially.

Fixed caliper bodies associated with fixed discs are also known, in which only one of the elongated portions of the caliper body has one or more cylinders adapted to accommodate hydraulic pistons capable of applying a thrust action on the friction pad facing it, making it abut against the braking surface of the disc, which in turn slides axially on its support and abuts against the opposite friction pad to apply the braking action.

In the known electro-actuated brake caliper solutions, e.g. as shown in document US-2017-0321773, in which the thrust means are electrically actuated and comprise, according to some known examples, a ball screw assembly in which the screw is moved by the electric motor and the nut screw or scroll or slider, moving axially on the screw and with respect to the caliper body, is intended to act as a piston or to push the piston to make the brake pad abut against the facing braking surface.

Therefore, in the case of electro-actuated brake calipers, the braking control is activated by the driver of the vehicle and, through suitably designed transducers, is translated into a sequence of drive signals of the electric motor which move the screw of the ball screw assembly, thereby determining the axial movement of the nut screw or scroll or slider.

Typically, such electric motor associated with the thrust means of an electro-actuated brake caliper, e.g. the screw of a ball screw assembly, is controlled by a loop control with feedback from sensors located on parts of the motor itself.

Such a solution, however, is not without drawbacks because the loop control with feedback thus obtained does not necessarily take into account the structural and dynamic effects caused by friction and deformation of the brake caliper or its parts, e.g. the brake caliper body.

Furthermore, in floating brake calipers, the axial guiding elements of the sliding or floating portion of the brake caliper can generate dynamic effects which are due to friction between the components in relative axial sliding.

Solutions which mount a sensor on the body of the electro-actuated brake caliper in the form of an elongated element which extends axially overhanging alongside the pads are known to estimate the braking torque applied on the brake disc based on the detection of the tangential deflection of the elongated element of the sensor, e.g. as shown in document US-2013-0233065.

However, this solution, which provides the sensor housed in an elongated cantilevered element placed tangentially alongside the brake pads, necessarily requires to take into account the axial thinning of the friction material of the brake pad due to prolonged use, which generates the gradual displacement in an axial direction towards the disc of the contact point between the side of the brake pad plate, which thus determines the deflection of the elongated cantilevered element that mounts the sensor.

It is therefore strongly felt the need to provide a solution to detect the force exchanged between the brake caliper and the brake disc.

The need is therefore strongly felt to provide improved control over the axial thrust action applied on at least one brake pad of a brake caliper to compensate for the structural and dynamic effects due to friction and deformation of the brake caliper or its parts which have an effect on the braking action.

SOLUTION

It is an object of the present invention to solve the drawbacks of the prior art and to provide a solution to the needs described hereto with reference to the prior art.

These and other objects are achieved by a brake caliper, a disc brake, and a detecting device as described and claimed herein.

Some advantageous embodiments are the object of the dependent claims.

By virtue of the suggested solutions, it is possible to detect the axial force exchanged between the caliper body of a brake caliper and the brake disc during the braking action.

FIGURE

Further features and advantages of the brake caliper, of the brake disc system and of the detecting device will be apparent from the following description of preferred embodiments thereof, by way of non-limiting examples, with reference to the accompanying figures, in which.

DESCRIPTION OF SOME PREFERRED EMBODIMENTS

Figure 1:
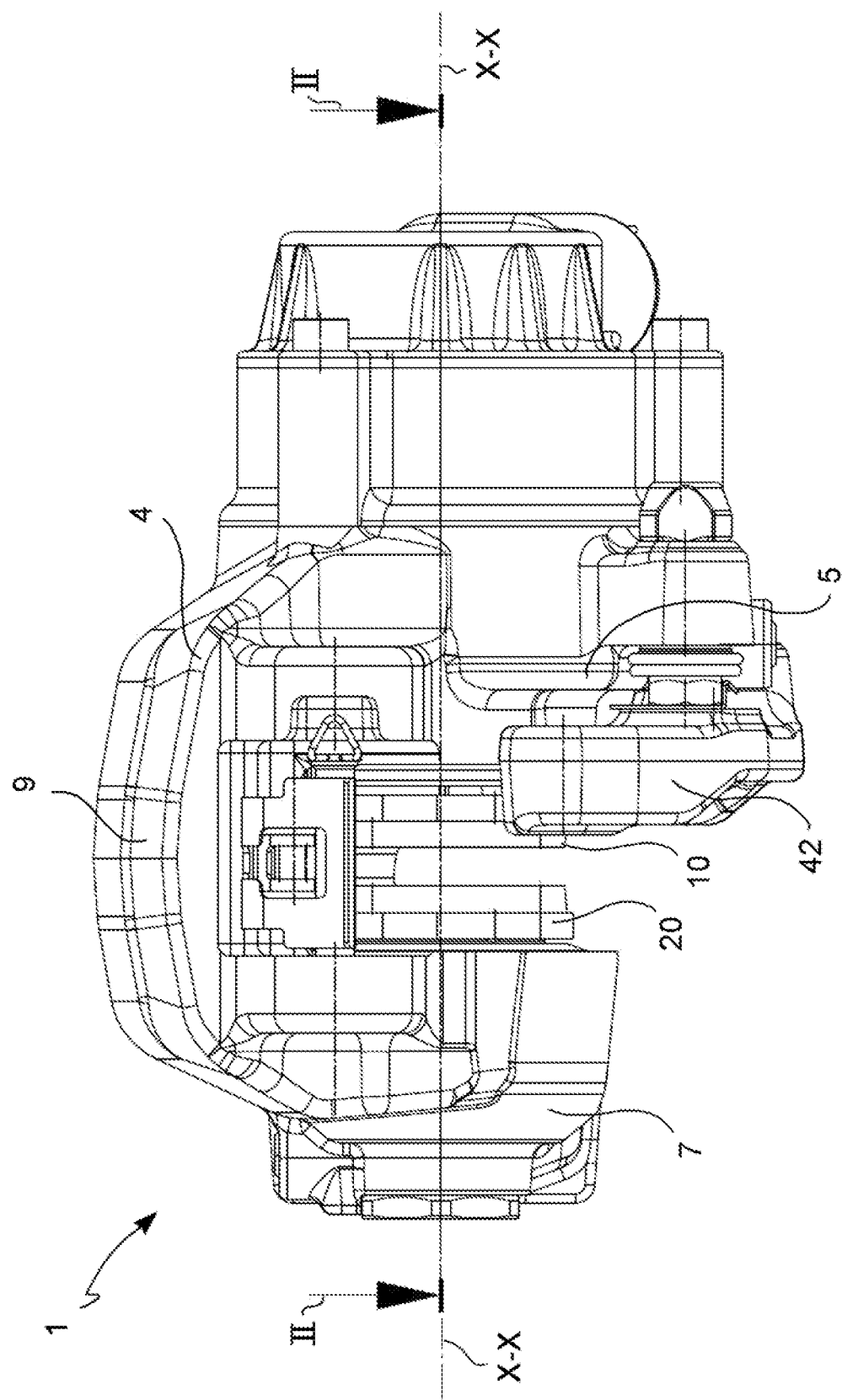
FIG. 1 is a vertical elevation view of a brake caliper, according to an embodiment.
Figure 2:
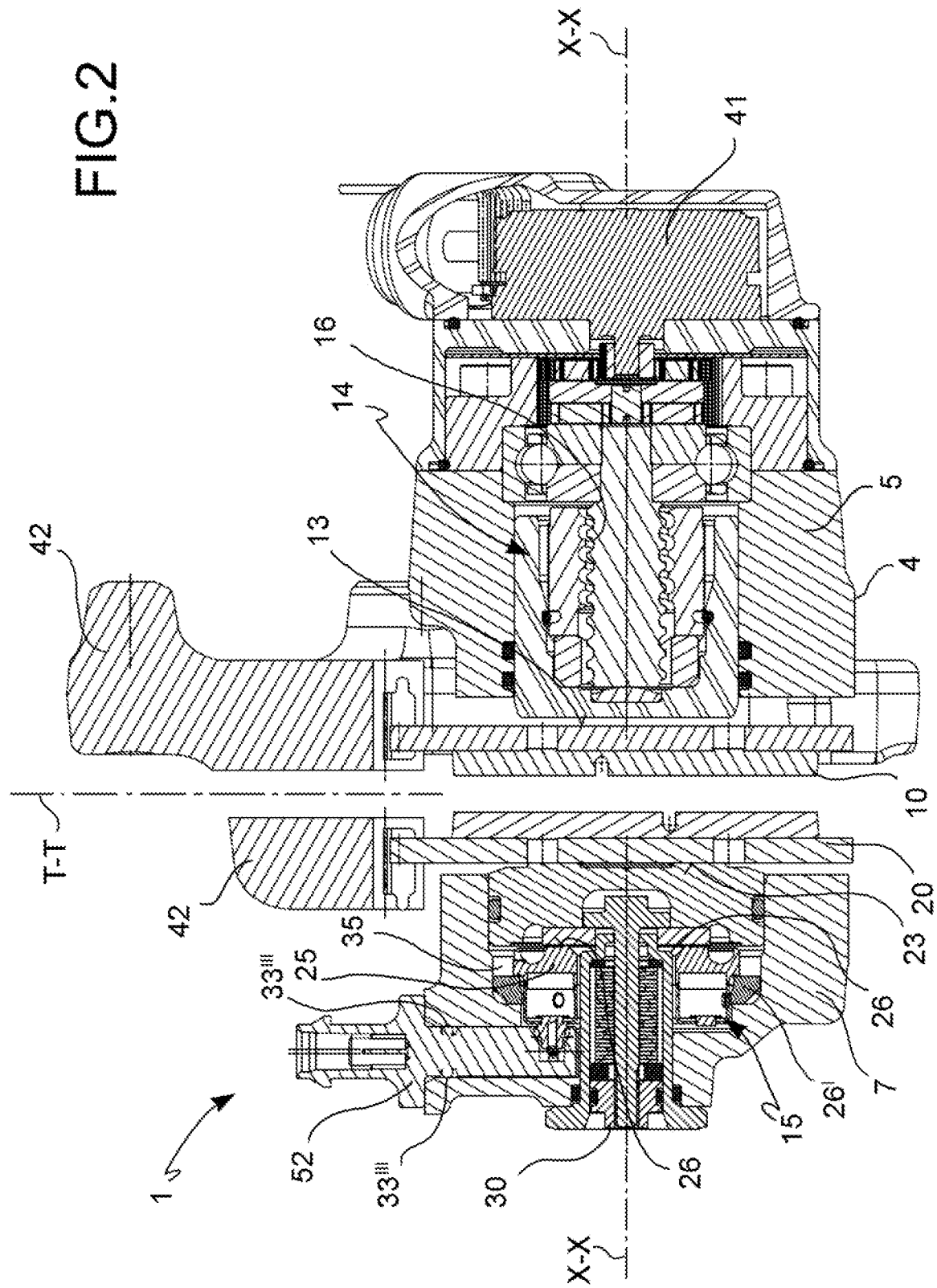
FIG. 2 is a section view taken along the plotting plane identified by arrows II-II in FIG. 1.
Figure 3:
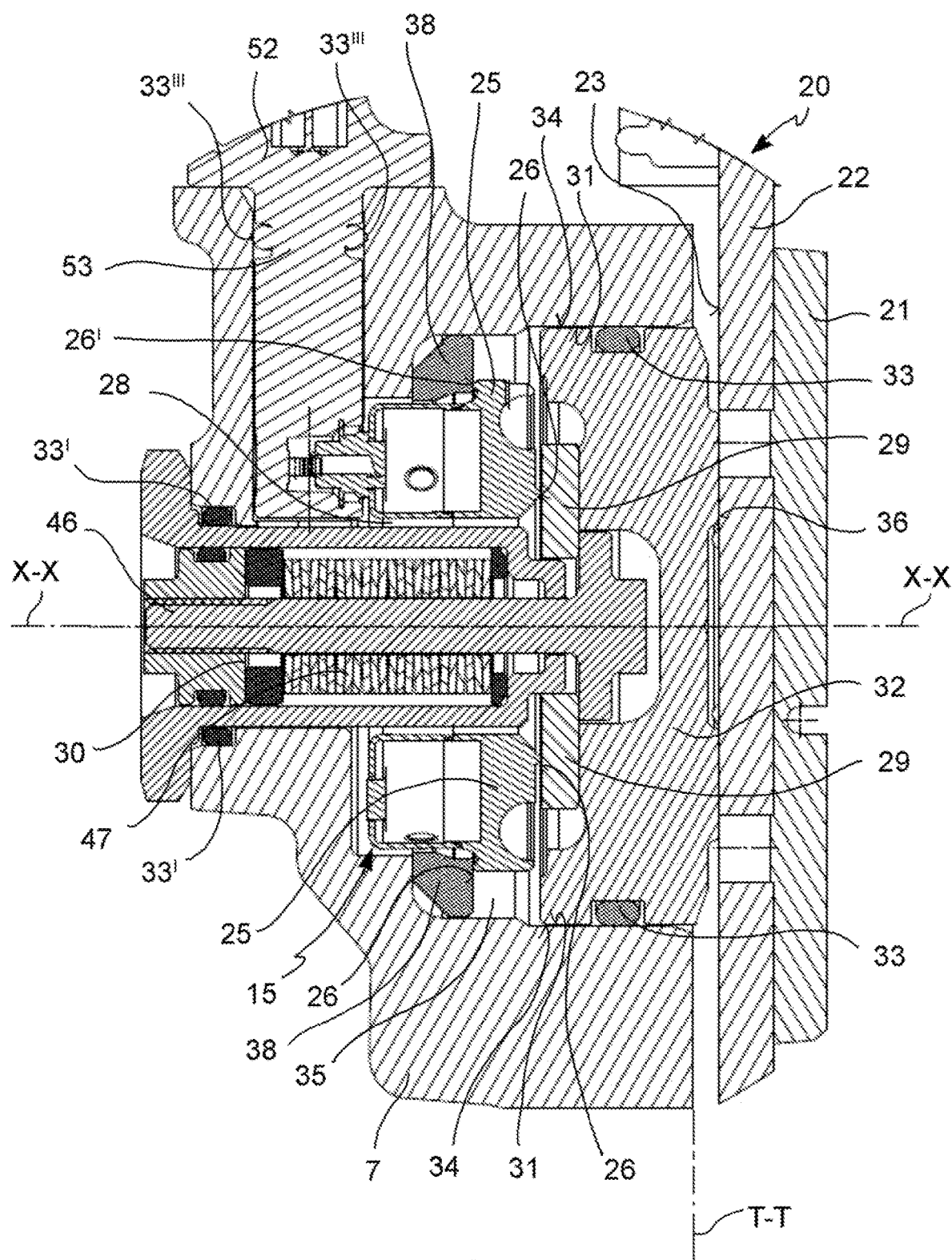
FIG. 3 is an enlargement of a portion of the brake caliper in FIG. 2.
Figure 4:
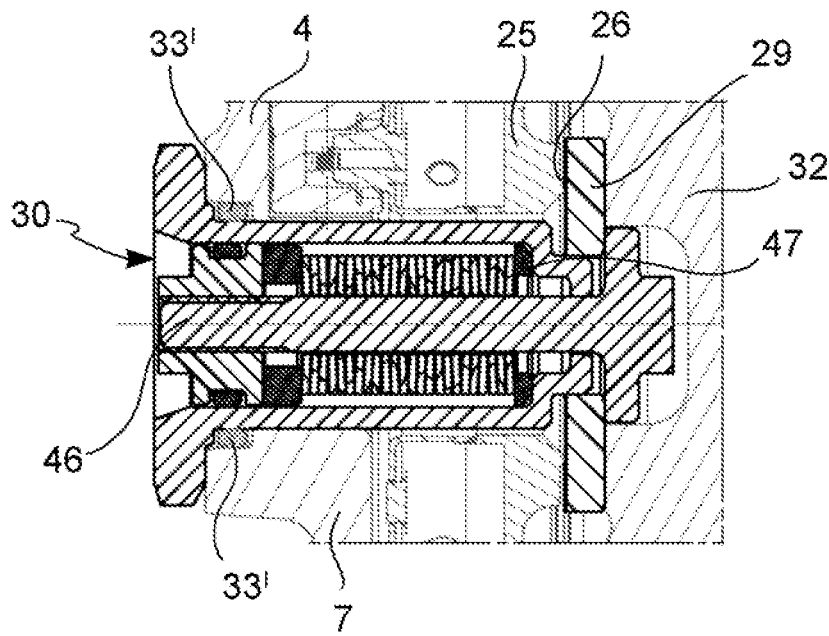
FIG. 4 is a view of an elastic device of a detecting device, according to an embodiment.
Figure 5:
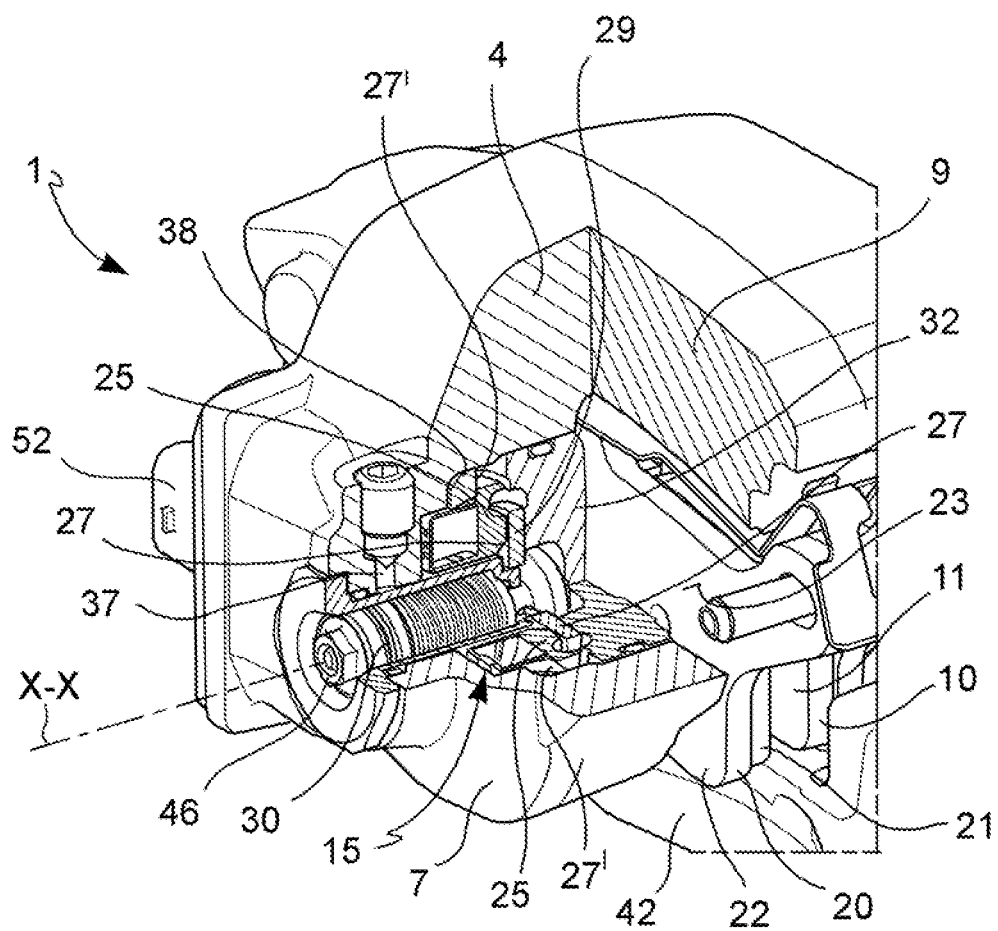
FIG. 5 is a partial section axonometric view of a brake caliper, according to an embodiment.
Figure 6:
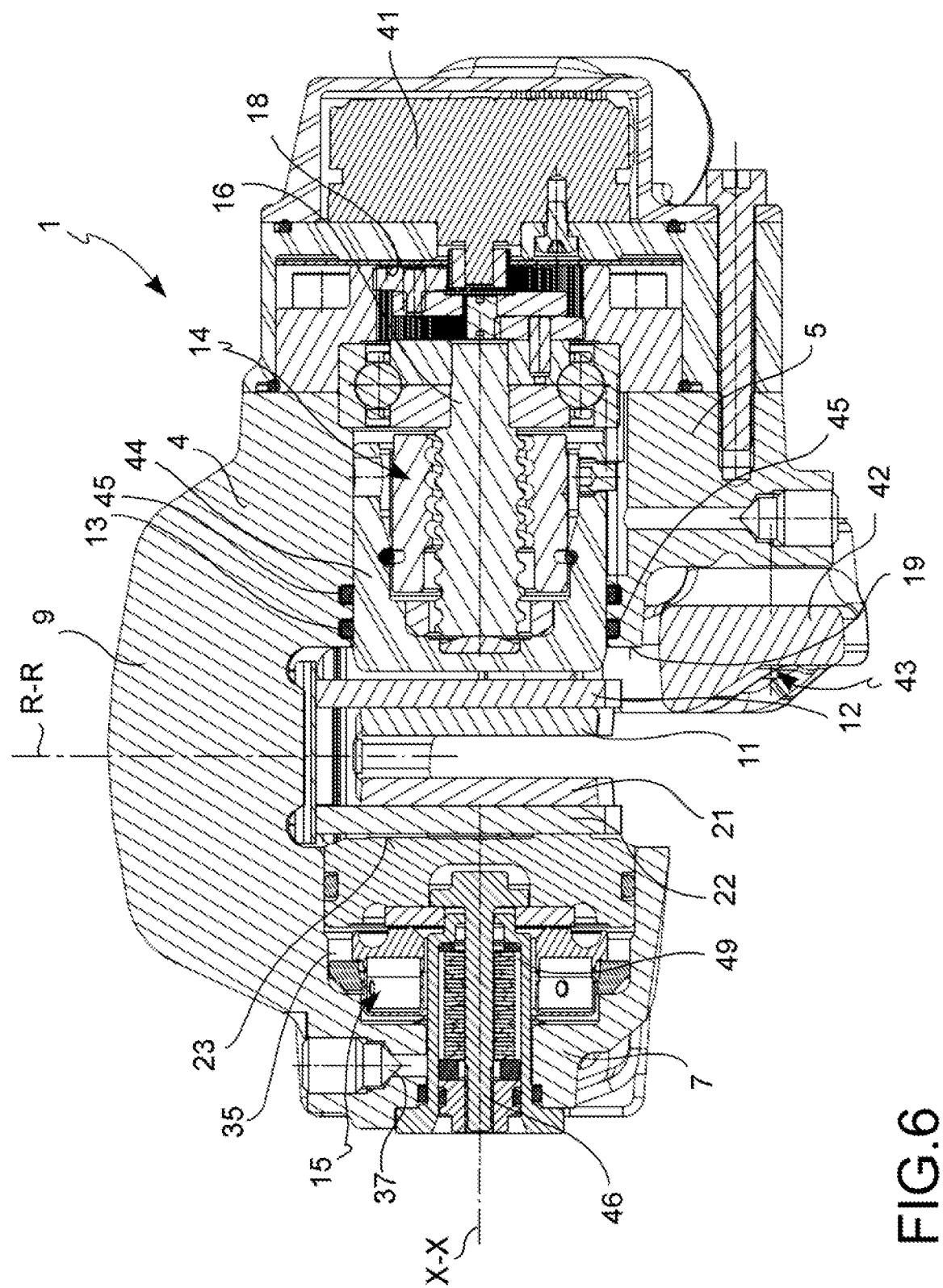
FIG. 6 is a section view of the brake caliper in FIG. 1, in which such a section is taken along a plotting plane parallel to the axial and radial directions.
Figure 7:
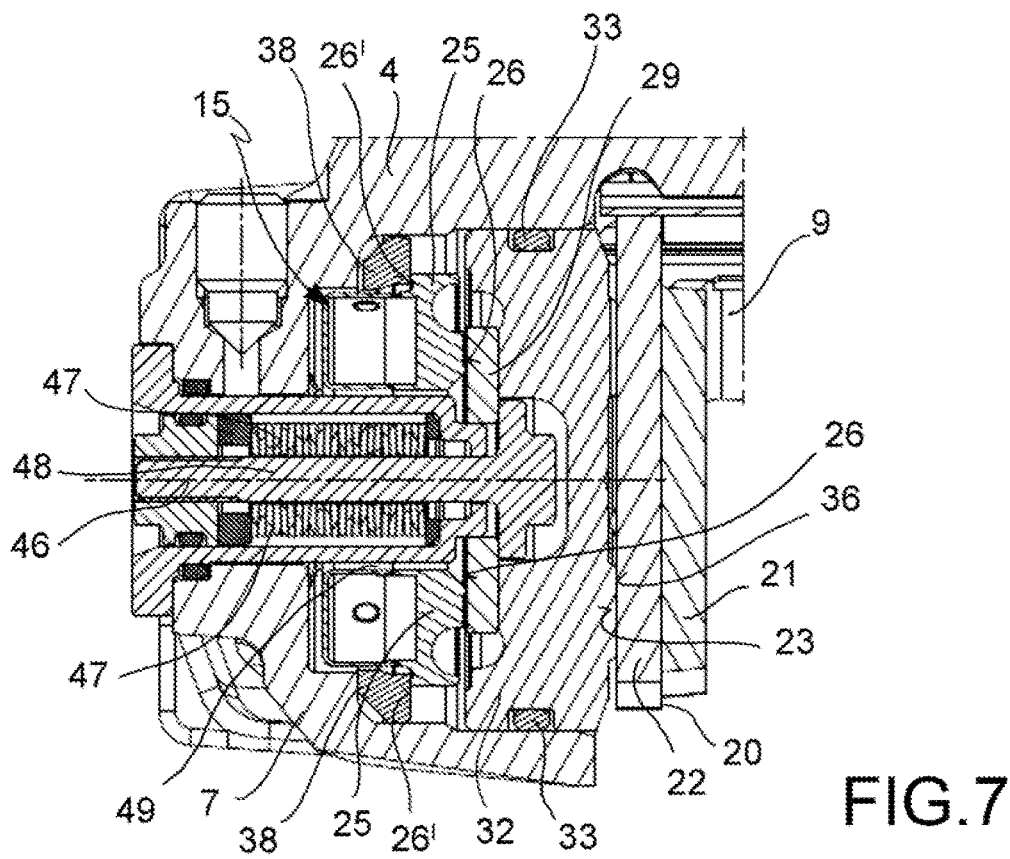
FIG. 7 is an enlargement of a portion of the brake caliper in FIG. 6.
Figure 8:
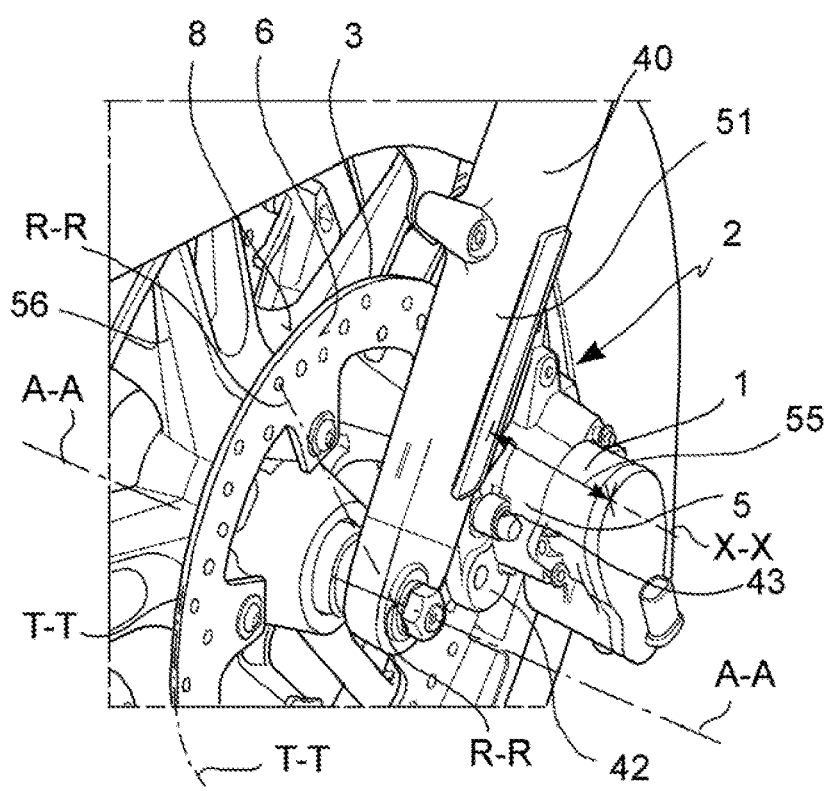
FIG. 8 is an axonometric view of a disc brake system according to a further embodiment, mounted on a motor-cycle.

According to a general embodiment, a brake caliper 1 for a disc brake 2 is provided.

In a disc brake 2 an axial direction X-X is defined either coinciding with or parallel to the rotation axis A-A- of the disc 3 of the disc brake 2, a radial direction R-R orthogonal to the axial direction X-X, and a tangential direction T-T, orthogonal to both the axial direction X-X and to the radial direction R-R.

Said brake caliper 1 comprises a caliper body 4, adapted to straddle the disc 3.

Said caliper body 4 comprises a first elongated portion 5 adapted to face a first braking surface 6 of the disc 3, and a second elongated portion 7, opposite to said first elongated portion 5 and adapted to face a second braking surface 8 of the disc 3 opposed to said first braking surface 6.

Said caliper body 4 further comprises at least one bridge 9 to connect said first elongated portion 5 and said second elongated portion 7 to each other arranged straddling the disc 3.

Said brake caliper 1 further comprises at least one pair of opposite brake pads 10, 20, comprising a first brake pad 10 and a second brake pad 20.

Each brake pad 10, 20 of said at least one pair of opposite brake pads 10, 20 comprises friction material 11, 21, and a support plate 12, 22, which supports said friction material 11, 21. Said support plate 12, 22 of each brake pad 10, 20 comprises a plate back 13, 23 facing a respective elongated portion 5 or 7 of said elongated portions 5, 7 of the caliper body 4.

In this manner, said first brake pad 10 comprises first friction material 11 and a first support plate 12 comprising a first plate back 13 and said second brake pad 20 comprises second friction material 21 and a second support plate 22 comprising a second plate back 23.

Said brake caliper 1 further comprises at least one thrust device 14 comprising an actuator 16, adapted to apply a thrust action on said plate back 13 to abut said first brake pad 10 of said pair of brake pads 10, 20 against a braking surface 6 of said facing braking surfaces 6, 8 of the disc 3. According to an embodiment, said thrust device 14 comprises at least one piston 44, adapted to press against the plate back 13 of the first brake pad 10.

According to an embodiment, said actuator 16 comprises a ball screw assembly designed to apply an axial thrust action on a piston 44 to push said first brake pad 10 axially to make it abut it against a facing braking surface 6 of the disc 3.

According to an embodiment, said caliper body 4 further comprises at least one housing adapted to receive at least one portion of said at least one thrust device 14. According to an embodiment, said at least one housing of the caliper body 4 comprises a housing bottom wall 18 facing in the axial direction X-X, and at least one housing edge 19, facing said back plate 13 of the first one brake pad 10. According to an embodiment, said piston 44 is associated with a seal 45 to prevent the infiltration of water or foreign bodies, such as dust or gravel, into the actuator.

Said brake caliper 1 further comprises at least one detecting device 15, adapted to detect a biasing force directed in axial direction X-X.

Advantageously, said detecting device 15 of the brake caliper 1 is interposed in axial direction X-X, either directly or indirectly, e.g. by the interposition of one or more components, e.g. such as a slewing ring body 29 and/or a slider 32, between said plate back 23 of said second brake pad 20 of said pair of brake pads 10, 20 and an elongated portion 7 of the caliper body 4.

According to a preferred embodiment, the provision of an actuator 16 between said detecting device 15 and said plate back 23 of said second brake pad 20 of said brake pad pair 10, 20 is avoided.

Improved measurement accuracy of the axial force exchanged between said second brake pad 20 and said second elongated portion 7 caliper body 4 is achieved by avoiding the provision of an actuator 16 axially placed between the detecting device 15 and the plate back 23 of the second brake pad 20.

Such a detecting device 15, which is therefore located axially between the caliper body 4 and the second brake pad 20, allows a precise and reliable measurement of the axial force exchanged with the brake disc during the braking action, which takes into account the effect of the friction between the brake caliper components in relative motion, e.g. in a relative sliding motion, as well as deformation of parts of the caliper body and/or the brake caliper itself.

Furthermore, the estimate of the axial force exchanged with the disc which can be obtained with such a detecting device 15, makes it possible to carry out a loop control with feedback on the thrust means. For example, such an estimate of the exchanged axial force can be stored by a control unit and compared with the power supply of an electric motor driving the thrust means of an electro-actuated brake caliper to diagnose possible malfunctions.

For example, in the case of a floating or axially sliding caliper, the friction due to the sliding of the axially sliding portion of the brake caliper necessarily generates a dissipation of the mechanical power generated by the electric motor. By virtue of such a detecting device 15, it is possible to estimate the force actually exchanged with the disc and therefore to evaluate the dissipations which arise due to friction.

According to a preferred embodiment, said connecting device 15 comprises at least one load cell 25. Preferably, said load cell 25 comprises at least one piezoelectric element.

According to an embodiment, said load cell 25 is adapted to work by deflection. In this manner, the load cell 25 is provided, for example, with a strain gage which detects the elongation of a deflected portion of the load cell body when measuring the force exchanged with the brake disc.

According to an embodiment, said load cell 25 is adapted to work in compression.

According to an embodiment, said load cell 25 comprises at least one contact ridge 26, 26', adapted to define a stretch of axial contact 27, 27' against a body axially abutting against said load cell 25.

According to an embodiment, said load cell 25 comprises at least two contact ridges 26 and 26', axially opposed to each other and the body of load cell 25, each contact ridge 26 or 26' of said at least two contact ridges 26, 26' is adapted to define an axial contact stretch 27, 27' against a body axially opposed to said load cell 25.

According to an embodiment, said axial contact stretch 27, 27' is at least an arc of a circumference. According to an embodiment, said axial contact stretch 27, 27' is a circumference.

According to an embodiment, the detecting device 15 comprises a connector 52 adapted to form an operational connection to a brake control, e.g. by means of one or more transducer units. According to an embodiment, said connector 52 comprises at least one sealing portion 33", e.g. a collar 53, to achieve a mechanical interference coupling with a portion of the caliper body 4. Preferably, said collar 53 applies a retaining action. According to an embodiment, said caliper body 4, and preferably said second elongated portion 7 of the caliper body 4 delimits an access channel to the load cell 25 which receives said connector 52.

According to an embodiment, said load cell 25 has an annular body which develops about a through opening 28. In this manner, it is possible to accommodate other components of the brake caliper 1 at least partially inside said through opening 29, thereby reducing the axial dimensions of the caliper body 4. In this manner, it is possible to accommodate an anti-rotation device at least partially in the through opening 29 of the load cell 25, for example.

According to an embodiment, said detecting device 15 comprises at least one slewing ring body 29 interposed in axial direction X-X between said plate back 23 of said second brake pad 20 and said load cell 25.

According to an embodiment, said at least one slewing ring body 29 is adapted to abut axially against said contact ridge 26 of the load cell 25.

According to an embodiment, said at least one slewing ring body 29 has an annular body which surrounds a through opening of slewing ring body. Preferably, said a through opening of a slewing ring coupling body is in axis, or coaxial, with said through opening 29 of the load cell 25.

According to an embodiment, said detecting device 15 further comprises at least one elastic device 30.

According to an embodiment, said elastic device 30 is adapted to apply a direct preload action in axial direction X-X between said load cell 25, and preferably said contact ridge 26 of the load cell 25, and said at least one slewing ring body 29.

According to an embodiment, said elastic element 30 comprises one or more conical spring washers 47. Preferably, said elastic device comprises a plurality of conical spring washers 47 stacked in axial direction X-X.

According to an embodiment, said elastic device 30 further comprises a regulating device 46, e.g. comprising an adjustment screw cooperating with a nut, said adjustment device 46 being adapted to carry said slewing ring body 29 into axial abutment on said load cell 25, thereby applying a preload action. The measurement error of the load cell 25 is minimized in this manner.

According to an embodiment, said plurality of conical spring washers 47 has an annular body which embraces the stem 48 of said adjustment screw of said adjustment device 46. According to an embodiment, the head 50 of the adjustment screw of the adjustment device 46 abuts axially against said slewing ring body 29, thereby biasing it axially against said load cell 25.

According to an embodiment, said elastic device 30 comprises at least one abutment body 49 which forms an axial abutment surface for said plurality of conical spring washers 47 to apply said preload action. For example, said abutment body 49 is essentially cup-shaped with a through opening in its bottom wall. By virtue of the provision of such an abutment body 49, said elastic device 30 forms a cartridge system with said adjustment device 46 which can be inserted axially into the brake caliper body 1.

According to an embodiment, said second elongated portion 7 of the caliper body 4 comprises at least one axial guiding wall 31, which extends in axial direction X-X between said plate back 23 of the second brake pad 20 and said load cell 25.

According to an embodiment, said detecting device 15 further comprises at least one slider 32, preferably associated in sealed manner with said at least one axial guiding wall 31, e.g. through the interposition of an O-ring 33, said at least one slider 32 cooperating with said at least one axial guiding wall 31 to slide in axial direction X-X when pushed by said second brake pad 20 during the braking action.

According to an embodiment, said at least one slider 32 comprises at least one axial guiding counter-wall 34 in contact with said at least one axial guiding wall 32 of the caliper body 4 to a predetermined axial extension X3.

According to an embodiment, said at least one slider 32 comprises an abutment surface 36, adapted to abut axially against said plate back 23 of said second brake pad 20.

Therefore, such a slider 32 is only adapted to bias the load cell 25 in an axial direction either directly or indirectly through the interposition of the said slewing ring body 29.

The provision of said at least one contact ridge 26 defining a contact section 27, 27' with said slewing ring body 29 and/or with said slider 32, guarantees that only axial stresses are transmitted to the load cell 25, thereby avoiding the transmission of flexural or torsional stresses, which could interfere with the reading of the detecting device 15. Preferably, said at least two contact ridges 26, 26', when observed, in section ideally define a single point of contact with said slewing ring body 29 and at least one point of contact with an annular abutment body 38.

Preferably, said at least two contact ridges 26, 26' are placed at different diameters of the annular body of the load cell to form two contact circumferences 27, 27' which are substantially concentric and coaxial. Preferably, a strain gage is applied between the two contact ridges 26, 26' to detect the elongation due to the bending of the annular body of the load cell 25 between said two contact ridges 26, 26'.

According to an embodiment, said slider 32 is made of thermally insulating material, e.g. phenolic resin. In this manner, the load cell 25 is protected from interferences caused by thermal stress. Preferably, said slider 32 is unsuitable for deformation by the effect of thermal stress when under operating conditions.

According to an embodiment, one or more seals are associated with the load cell body 25 to provide a protective seal against infiltrations.

According to an embodiment, an annular abutment body 38, e.g. made of steel, is associated with the body of load cell 25 to form an axial abutment and radial positioning reference for the load cell 25. The provision of such an annular body 38 also makes it possible to form a non-deformable abutment reference in operating conditions.

According to an embodiment, said detecting device 15 comprises at least one sealing element 33, 33', 33''', and preferably a plurality of sealing elements 33, 33', 33''', which define a sealed chamber 35 which receives at least said load cell 25. In this manner, foreign bodies, as well as liquids, are prevented from interfering with the reading of the load cell 25. According to an embodiment, said sealing elements comprise O-rings and/or sealed threaded connections.

According to an embodiment, a pneumatic device 37 is provided to eject, and to assemble, at least one component from the said sealed chamber 35 defined by the detecting device 15. Indeed, by virtue of said pneumatic device 37 which comprises a pipe, an undesirable increase in chamber pressure, which could lead to failure to reach the resting position of the slider 32, is avoided.

Preferably, said pneumatic device 37 comprises at least one pipe leading onto a wall of said slider 32, e.g. said abutment surface 36, to disassociate said slider 32 from the caliper body 4 when activated, e.g. by blowing compressed air. Disassembly operations are facilitated in this manner.

According to an embodiment, said actuator 16 of the thrust device 14 is associated with an electrically powered motor 41. For example, said motor 41 comprises a rotor and a stator both received in the caliper body 4, and preferably in the first elongated portion 5 of the caliper body 4.

According to an embodiment, said brake caliper 1 further comprises a bracket 42 comprising fixing means 43 for fixing said brake caliper 1 for a vehicle 40.

According to an embodiment, said caliper body 4 is adapted to slide in axial direction X-X with respect to the bracket 42 to apply the braking action. In this manner, a floating brake caliper 1 is made.

According to an embodiment, said caliper body 4 is made in a single piece. In other words, it is a monobloc. Preferably, said caliper body 4 is made with a single casting.

According to an embodiment, said caliper body 4 is monobloc and is adapted to slide on the bracket 42.

According to a general embodiment, a disc brake system 2 comprises at least one brake caliper 1 according to any one of the embodiments described above.

Said disc brake system 2 further comprises at least one disc 3. Said disc 3 defines a rotation axis A-A. In said disc brake system 2 an axial direction X-X is defined either coinciding with or parallel to the rotation axis A-A- of the disc 3 of the disc brake 2, a radial direction R-R orthogonal to the axial direction X-X, and a tangential direction T-T, orthogonal to both the axial direction X-X and to the radial direction R-R.

According to a preferred embodiment, said disc brake system 2 further comprises at least one braking control. Preferably, said braking control comprises a control lever.

Preferably, the term "braking control" means a control interface intended to receive a control from a driver of the vehicle 40 to apply a braking action.

Preferably, the term "braking action" means the clamping action of the opposite braking surfaces 6, 8 applied by the opposite brake pads 10, 20 of the brake caliper 1 when activated by the thrust device 14, thereby generating a braking torque.

Preferably, the term "braking torque" means the force generated by the brake pads 10, 20 to brake the disc 3 applied on the opposite braking surfaces 6, 8 at a predefined radial distance from the rotation axis A-A of the disc 3.

According to an embodiment, said disc brake system 2 comprises at least one electric motor 41 for the activation of said thrust device 14.

According to an embodiment, said disc brake system 2 comprises at least one transducer unit operationally connected to said braking control and said detecting device 15.

Preferably, said at least one transduction unit is configured to transmit a control signal to said thrust device 14, e.g. by activation of said electric motor 41, based on a control action transmitted by the braking control when activated by the driver of the vehicle.

According to a general embodiment, the vehicle 40 comprises at least one disc brake 2 according to any one of the embodiments described above.

Preferably, said vehicle 40 is a motorcycle 40.

For example, said motorcycle 40 is adapted to lean when cornering.

According to an embodiment, said motorcycle 40 comprises at least one fork 51 associated with said bracket 42 through fixing means 43.

According to an embodiment, said first elongated portion 5 of the caliper body 4, which receives said electric motor 41 of the brake caliper 1, is placed on the side of disc 3 facing said fork 51, projecting axially beyond the axial level of said fork 51 by a predetermined amount 55.

According to an embodiment, said second elongated portion 7 of the caliper body 4, comprising said detecting device 15, is placed on the side of disc 3 facing the motorcycle wheel 56.

According to an embodiment, said braking control 17 comprises a control lever preferably associated with the handlebar of the motorcycle 40.

According to an embodiment, at least one detecting device 15, adapted to detect a biasing force directed in axial direction X-X.

Said detecting device 15 comprises at least one load cell 25.

Said load cell 25 comprises at least one contact ridge 26, 26', adapted to define an axial contact stretch 27, 27' preferably a circumference against a body axially abutting against said load cell 25. Preferably, said body axially abutting against said load cell 25 is a brake pad 10, 20. In this manner, it is possible to detect the axial force exchanged between the brake disc and the brake pad 10, 20 which is the first member of the brake caliper which provides the force to the brake disc during the braking action.

According to a preferred embodiment, said load cell 25 has an annular body which develops about a through opening 28.

According to an embodiment, said detecting device 15 comprises at least one of the features described in any one of the embodiments described above.

According to a general embodiment, a vehicle is provided comprising at least one detecting device according to any one of the embodiments described above. According to an embodiment, said vehicle is a car. According to an embodiment, said vehicle is a motorcycle.

By virtue of the features described above, provided either separately or in combination, it is possible to respond to the needs mentioned above, and to obtain the aforesaid advantages, in particular:

the brake control, typically a control lever and/or brake pedal, is provided with feedback on the force exchanged between brake pad and caliper body;

it provides an electro-actuated floating brake caliper with unusual performance in terms of control by the driver of the vehicle even in emergency situations, as well as improved comfort for the driver of the vehicle;

it is possible to detect, as needed, only the axial stress exchanged between brake pad and caliper body, avoiding to detect shear, bending and/or torsional stress;

it is possible to house a body, e.g. an elastic device, within the overall dimensions of the load cell 25, thereby reducing the overall dimensions of the brake caliper, the performance being the same;

a compact caliper body is provided, particularly in the axial direction, reducing the axial dimension of the cantilevered portion of the brake caliper.

it is possible to integrate the anti-rotation in the piston and not in the caliper body, thereby resulting in a further reduction of dimensions;

it is possible to make the monoblock caliper body, even in the case of a floating brake caliper;

the brake caliper can be mounted from a single axial side of the brake disc;

it is possible to preload the sensor impacting on external dimensions, using a masked volume;

it makes it possible to simplify the transmission-screw mechanical layout for the removal of the sensor component and above all of the management of electrical contacts.

The person skilled in the art may make many changes and adaptations to the embodiments described above or may replace elements with others which are functionally equivalent to satisfy contingent needs without however departing from the scope of the appended claims.

LIST OF REFERENCES

1. Brake caliper
2. Disc brake system, or disc brake
3. Disc brake disc
4. Caliper body
5. First elongated portion of the caliper body
6. First braking surface of the disc
7. Second elongated portion of the caliper body
8. Second braking surface of the disc
9. Caliper body bridge
10. First brake pad
11. Friction material of the first brake pad
12. Support plate of the first brake pad
13. Back plate of the first brake pad
14. Thrust device
15. Detecting device
16. Actuator
18. Housing bottom wall
19. Housing edge
20. Second brake pad
21. Friction material of the second brake pad
22. Support plate of the second brake pad
23. Back plate of second brake pad
25. Load cell
26, 26' Contact ridges
27, 27'. Contact stretches
28. Through opening of the load cell
29. Slewing ring body
30. Elastic device
31. Guide axial wall
32. Slider
33, 33', 33'" Sealing element
34. Axial guiding counter-wall
35. Sealed chamber of the detecting device
36. Slider abutment surface
37. Ejection device
38. Abutment annular body
40. Vehicle or motorcycle
41. Electric motor
42. Brake caliper bracket
43. Fixing means
44. Thrust device piston
45. Seal
46. Adjustment device
47. Conical spring washer
48. Adjustment screw stem
49. Abutment body
50. Adjustment screw head
51. Fork
52. Connector 53. Collar
55. Cantilevered axial extension
56. Wheel
A-A. Disc rotation axis
X-X. Axial direction
R-R. Radial direction
T-T. Tangential direction

The invention claimed is:

1. A brake caliper for a disc brake system, wherein an axial direction (X-X), either coinciding with or parallel to a rotation axis (A-A) of a disc of a disc brake, a radial direction (R-R) orthogonal to the axial direction (X-X), and a tangential (T-T) direction, orthogonal both to the axial direction (X-X) and to the radial direction (R-R) are defined;
said brake caliper comprising a caliper body configured to straddle the disc, wherein said caliper body comprises:
a first elongated portion configured to face a first braking surface of the brake disc, and
a second elongated portion, opposite to said first elongated portion and configured to face a second braking surface of the brake disc opposite to said first braking surface, and
at least one bridge for connecting said first elongated portion and said second elongated portion to each other arranged straddling the disc;
wherein said brake caliper further comprises at least one pair of opposite brake pads comprising a first brake pad and a second brake pad;
each brake pad of said at least one pair of opposite brake pads comprising:
friction material, and
a support plate, which supports said friction material, wherein said support plate of each brake pad comprises a plate back facing a respective elongated portion of said first and second elongated portions of the caliper body;
and wherein said brake caliper further comprises:
at least one thrust device comprising an actuator, configured to apply a thrust action on said plate back to abut said first brake pad of said at least one pair of opposite brake pads against the first braking surface of the disc; and
at least one detecting device configured to detect a biasing force directed in axial direction (X-X); wherein
said at least one detecting device is interposed between said plate back of said second brake pad of said at least one pair of opposite brake pads and the second elongated portion of the caliper body,
wherein said at least one detecting device comprises at least one load cell.

2. The brake caliper of claim 1, wherein:
said at least one detecting device is interposed between said plate back of said second brake pad of said at least one pair of opposite brake pads and the second elongated portion of the caliper body, avoiding provision of an actuator between said at least one detecting device and said plate back of said second brake pad of said at least one pair of opposite brake pads;
said at least one detecting device is directly interposed between said plate back of said second brake pad of said at least one pair of opposite brake pads and the second elongated portion of the caliper body, and wherein said at least one detecting device is directly in contact with said plate back of said second brake pad of said at least one pair of opposite brake pads and the second elongated portion of the caliper body.

3. The brake caliper of claim 1, wherein said at least one detecting device comprises at least one slewing ring body interposed in axial direction (X-X) between said plate back of said second brake pad and said at least one load cell, and wherein said at least one slewing ring body is configured to axially abut against said at least one contact ridge of the at least one load cell.

4. The brake caliper of claim 3, wherein said at least one detecting device further comprises at least one elastic device, and wherein said at least one elastic device is configured to apply a direct preload action in axial direction (X-X) between said at least one load cell and said at least one slewing ring body.

5. The brake caliper of claim 1, wherein:
said second elongated portion of the caliper body comprises at least one axial guiding wall, which extends in axial direction (X-X) between said plate back of the second brake pad and said at least one load cell;
said at least one detecting device further comprises at least one slider sealingly associated with said at least one axial guiding wall by interposing an O-ring, said at least one slider cooperating with said at least one axial guiding wall to slide in axial direction (X-X) when pushed by said second brake pad during a braking action.

6. The brake caliper of claim 1, wherein said at least one detecting device comprises at least one sealing element defining a sealed chamber that receives said at least one load cell, and wherein a pneumatic device is provided for ejecting and/or assembling at least one component from said sealed chamber defined by the at least one detecting device.

7. The brake caliper of claim 1, wherein said actuator of the thrust device is associated with an electrically powered motor, wherein
said brake caliper further comprises a bracket comprising fixing means for fixing said brake caliper to a vehicle;
said caliper body is configured to slide in axial direction (X-X) with respect to the bracket to apply a braking action; and wherein
said caliper body is made in a single piece.

8. A disc brake system comprising at least one brake caliper according to claim 1, and at least one disc.

9. A motor vehicle comprising at least one disc brake system according to claim 8.

10. A detecting device, configured to detect a biasing force directed in axial direction (X-X), comprising at least one load cell, said at least one load cell having an annular body which develops about a through opening, wherein said at least one load cell comprising at least one contact ridge, wherein said at least one contact ridge is raised in axial direction (X-X) with respect to said annular body, wherein said at least one contact ridge is configured to define at least one stretch of axial contact against a body axially abutting against said at least one load cell.

11. The detecting device of claim 10, wherein said at least one load cell comprises two contact ridges of said at least one contact ridge, wherein said two contact ridges are placed at different diameters of the annular body of the at least one load cell to form two contact circumferences which are concentric and coaxial.

12. The detecting device of claim 11, wherein a strain gage is applied between the two contact ridges to detect an elongation due to a bending of the annular body of the at least one load cell between said two contact ridges.

13. The brake caliper of claim 1, said at least one load cell comprises at least one contact ridge, configured to define an axial contact stretch against a body axially abutting against said at least one load cell;

said axial contact stretch is at least one arc of circumference; or wherein said axial contact stretch is a circumference.

14. The brake caliper of claim 1, said at least one load cell comprises two contact ridges, each configured to define an axial contact stretch against a body axially abutting against said at least one load cell, wherein said at least one load cell has annular body which develops around a through opening, wherein said two contact ridges are placed at different diameters of said annular body of the at least one load cell to form two contact circumferences which are concentric and coaxial.

15. The brake caliper of claim 14,
wherein
a strain gage is applied between the two contact ridges to detect an elongation due to a bending of the annular body of the at least one load cell between said two contact ridges.

16. The brake caliper of claim 5,
wherein
said at least one slider comprises at least one axial guiding counter-wall in contact with said at least one axial guiding wall of the caliper body over a predetermined axial extension; and wherein
said at least one slider comprises an abutment surface, configured to axially abut against said plate back of said second brake pad.

17. The brake caliper of claim 4, wherein said elastic device further comprises a regulating device, wherein the regulating device is configured to carry said slewing ring body into axial abutment on said load cell, thereby applying said direct preload action.

* * * * *